US00RE50199E

(19) United States
(12) Reissued Patent
Amidon et al.

(10) Patent Number: US RE50,199 E
(45) Date of Reissued Patent: Nov. 5, 2024

(54) SYSTEM AND METHOD FOR DETECTING A MALICIOUS ACTIVITY IN A COMPUTING ENVIRONMENT

(71) Applicant: AWAKE SECURITY LLC, Santa Clara, CA (US)

(72) Inventors: Keith Amidon, Los Altos, CA (US); Michael Callahan, Palo Alto, CA (US); Debabrata Dash, San Jose, CA (US); Gary Golomb, Los Gatos, CA (US)

(73) Assignee: ARISTA NETWORKS, INC., Santa Clara, CA (US)

(21) Appl. No.: 17/677,084

(22) Filed: Feb. 22, 2022

Related U.S. Patent Documents

Reissue of:
(64) Patent No.: 10,237,287
Issued: Mar. 19, 2019
Appl. No.: 15/042,127
Filed: Feb. 11, 2016

(51) Int. Cl.
*G06F 12/14* (2006.01)
*H04L 9/40* (2022.01)
*H04L 29/06* (2006.01)

(52) U.S. Cl.
CPC ..... *H04L 63/1416* (2013.01); *H04L 63/1433* (2013.01)

(58) Field of Classification Search
CPC ..... H04L 63/1416; H04L 63/1408; H04L 63/1441; H04L 63/1458; H04L 63/145; G06F 21/552; G06F 21/562; G06F 21/564; G06F 21/566; G06F 21/56
USPC ..... 726/22–26; 713/188
See application file for complete search history.

(56) References Cited

U.S. PATENT DOCUMENTS

| | | | | |
|---|---|---|---|---|
| 7,609,629 | B2 * | 10/2009 | Watanabe | H04L 43/00 709/230 |
| 7,823,202 | B1 * | 10/2010 | Nucci | H04L 45/00 709/224 |
| 8,683,584 | B1 * | 3/2014 | Daswani | H04L 63/1408 726/25 |
| 8,776,229 | B1 * | 7/2014 | Aziz | H04L 63/1425 713/176 |
| 8,789,173 | B2 * | 7/2014 | Narayanaswamy | H04L 63/1458 726/22 |
| 8,914,878 | B2 * | 12/2014 | Burns | H04L 63/1441 726/23 |
| 9,521,162 | B1 * | 12/2016 | Zand | H04L 63/1441 |
| 9,635,039 | B1 * | 4/2017 | Islam | H04L 63/145 |
| 9,749,340 | B2 * | 8/2017 | Huston, III | H04L 63/1416 |
| 9,787,700 | B1 * | 10/2017 | Amin | H04L 63/1433 |
| 10,084,816 | B2 * | 9/2018 | Zhang | H04L 63/1466 |
| 2005/0198099 | A1 * | 9/2005 | Motsinger | G06F 21/55 709/200 |

(Continued)

*Primary Examiner* — Minh Dieu Nguyen
(74) *Attorney, Agent, or Firm* — Fountainhead Law Group, PC

(57) ABSTRACT

System and method for detecting a likely threat from a malicious attack is disclosed. Communication between a user computer and a destination computer is monitored by a security appliance. Selective information from the communication is extracted. One or more weak signals of a threat is detected based on the selective information. One or more weak signals are evaluated for a likely threat based on a threshold value. A corrective action is initiated for the likely threat, based on the evaluation.

18 Claims, 6 Drawing Sheets

(56) References Cited

U.S. PATENT DOCUMENTS

| | | | | |
|---|---|---|---|---|
| 2009/0293122 | A1* | 11/2009 | Abdel-Aziz | H04L 63/1416 726/23 |
| 2010/0115621 | A1* | 5/2010 | Staniford | H04L 63/1416 726/25 |
| 2010/0169971 | A1* | 7/2010 | Raviv | G06F 21/316 726/23 |
| 2015/0230091 | A1* | 8/2015 | Sahu | H04L 43/18 455/410 |
| 2015/0264078 | A1* | 9/2015 | Beauchesne | H04L 63/1441 726/23 |
| 2016/0021139 | A1* | 1/2016 | Stephan | H04L 63/02 726/1 |
| 2016/0080404 | A1* | 3/2016 | Kohout | H04L 63/1408 726/23 |
| 2016/0191551 | A1* | 6/2016 | Beauchesne | G06F 17/30525 726/23 |
| 2016/0323304 | A1* | 11/2016 | Terada | H04L 63/1408 |
| 2016/0381051 | A1* | 12/2016 | Edwards | H04L 63/145 726/23 |

* cited by examiner

SYSTEM AND METHOD FOR DETECTING A MALICIOUS ACTIVITY IN A COMPUTING ENVIRONMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[None.] *This is a reissue application of U.S. application Ser. No. 15/042,127, filed Feb. 11, 2016, now U.S. Pat. No. 10,237,287 issued Mar. 19, 2019.*

TECHNICAL FIELD

The present invention relates generally to detecting a malicious activity in a computing environment and, more particularly, to detecting a malicious activity based on network communication in the computing environment.

DESCRIPTION OF RELATED ART

Detecting malicious activity in a computing environment is becoming complex. Sometimes, malicious code is downloaded on to a computing device at one instant. The malicious code remains dormant for a period of time while awaiting further command. At a later stage, additional commands are issued to the malicious code to initiate the malicious activity.

Generally, after the malicious attack has occurred and detected, a signature of the malicious code is identified. Thereafter, a malware scanner may look for a partial or full match of the identified signature of the malicious code to identify and prevent future attacks. In other words, a corrective action is taken after an attack has occurred.

It may be desirable to predict a possible malicious attack, before the attack takes place. It is with these needs in mind, this disclosure arises.

SUMMARY OF THE INVENTION

In one embodiment, a method for detecting a likely threat from a malware attack is disclosed. Communication between a user computer and a destination computer is monitored by a security appliance. Selective information from the communication is extracted by the security appliance. One or more weak signals of a threat is detected based on the selective information by the security appliance. One or more weak signals are evaluated for a likely threat based on a threshold value by the security appliance. A corrective action for the likely threat is initiated based on the evaluation by the security appliance.

In yet another embodiment, a system to detect a likely threat from a malware attack is disclosed. Communication between a user computer and a destination computer is monitored by a security appliance. Selective information from the communication is extracted by the security appliance. One or more weak signals of a threat is detected based on the selective information by the security appliance. One or more weak signals are evaluated for a likely threat based on a threshold value by the security appliance. A corrective action for the likely threat is initiated based on the evaluation by the security appliance.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 4-1 and 4-2 shows an example flow diagram to evaluate weak signals for a likely threat, according to an example of this disclosure;

DETAILED DESCRIPTION

Figure 1:
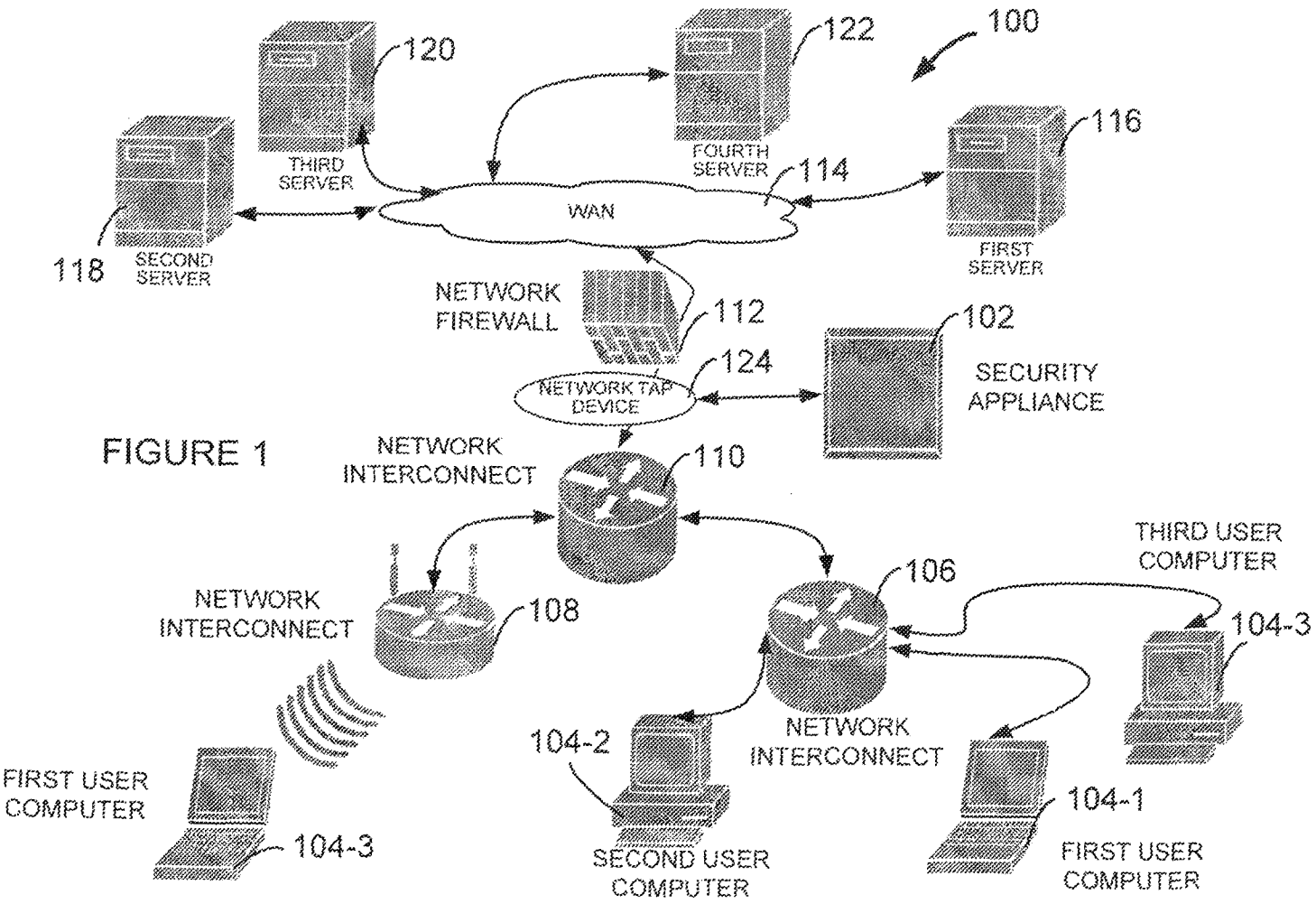
FIG. 1 shows an example computing environment with example security appliance of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for detecting a malicious activity in a computing environment. Referring now to the drawings, where similar reference characters denote corresponding features consistently throughout the figures, various examples of this disclosure is described.

FIG. 1 depicts an example computing environment 100, with a security appliance 102 of this disclosure. The computing environment 100 includes a plurality of user computers, for example, a first user computer 104-1, a second user computer 104-2 and a third user computer 104-3. The computing environment also includes a plurality of network interconnect devices 106, 108 and 110. In some examples, network interconnect device 106 may couple first user computer 104-1, second user computer 104-2 and third user computer 104-3 to form a local area network, for example, an office network. The network interconnect device 108 may be a wireless router, for example, in a conference room, that may couple one or more user computers to form another network, for example, conference room wireless network. For example, the first user computer 104-1 may also selectively couple to the network interconnect device 108, when the first user computer 104-1 is in the conference room.

The network interconnect device 110 may be configured to couple to a network firewall device 112, which may couple the network interconnect device 110 to a wide area network 114. The network interconnect device 106 and 108 may couple to network interconnect device 110 to access the wide area network 114. A plurality of servers, for example, a first server 116, a second server 118, a third server 120 and a fourth server 122 may be coupled to the wide area network 114. The plurality of servers may be accessible to the first user computer 104-1, second user computer 104-2 and the third user computer 104-3 through the network interconnect device 110.

In one example, a network tap device 124 may be disposed between the network interconnect device 110 and the firewall device 112. The network tap device 124 may be configured to intercept and forward any communication between a user computer and a server, over the wide area network 110 to the security appliance 102. Various functions and features of the security appliance 102 will now be described with reference to FIG. 2.

Figure 2:
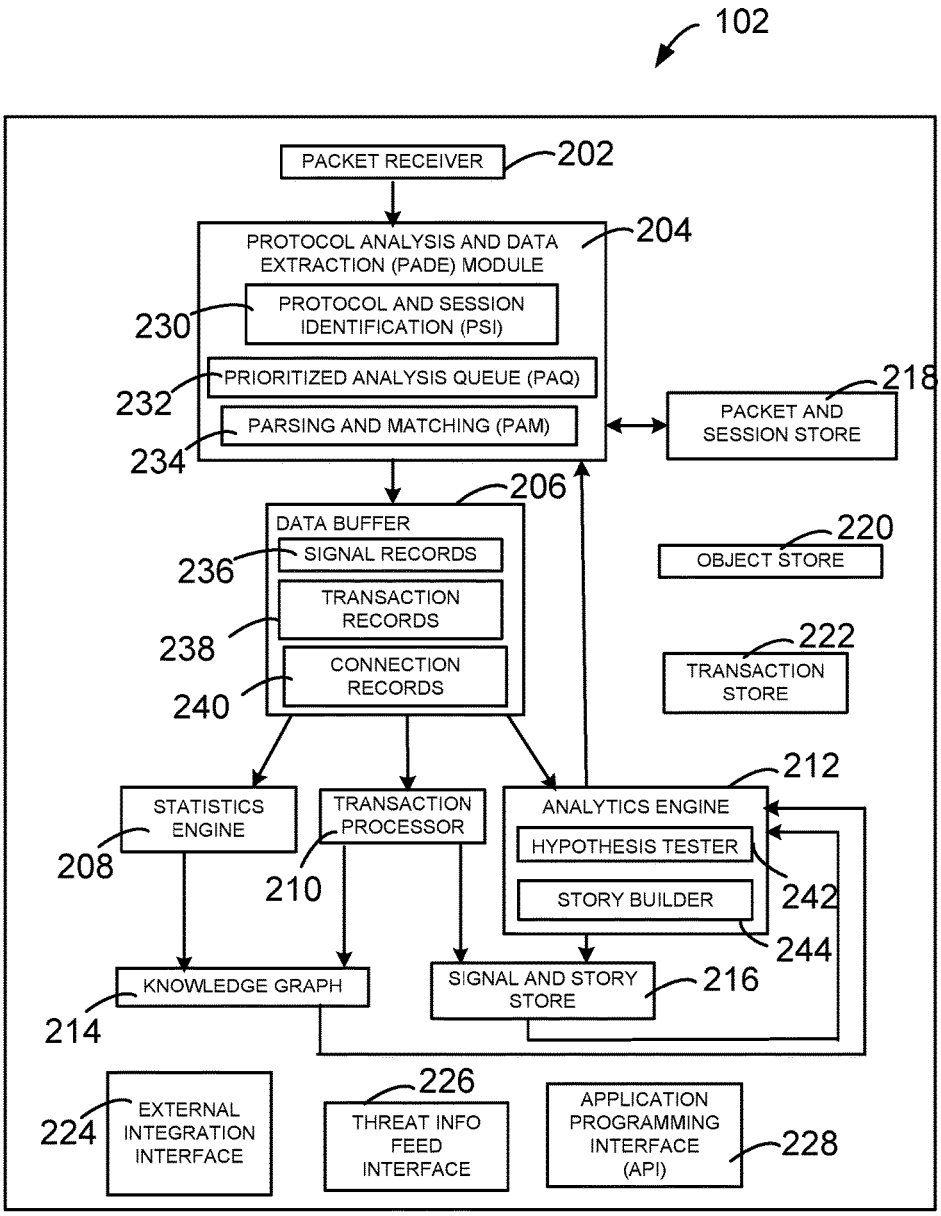
FIG. 2 depicts block diagram of an example security appliance of this disclosure.

Now, referring to FIG. 2, example security appliance 102 of this disclosure will be described. The security appliance 102 includes a packet receiver 202, a protocol analysis and data extraction module 204 (sometimes referred to as PADE module 204), a data buffer 206, a statistics engine 208, a transaction processor 210, an analytics engine 212, a knowledge graph 214, a signal and story store 216, a packet and session store 218, an object store 220 and a transaction store 222. The security appliance may additionally have an external integration interface 224, a threat info feed interface 226 and an application programming interface (API) 228. Various function and features of the security appliance 102 will now be described. Detailed operation of the security appliance 102 will be later described with reference to additional examples and figures.

The packet receiver 202 is configured to receive information from the network tap device 124. For example, packet receiver 202 may receive information related to network communication between a user computer and one or more servers, from the network tap device 124 in real time. Information related to network information may be one or more packets of information transmitted and received by the user computer. In some examples, the packet receiver 202 may be configured to receive information related to network communication between a user computer and one or more servers that might have been captured by a capture device (not shown) and stored in a data store (not shown). The information related to network communication between a user computer and one or more servers may sometimes be referred to as packets or packet of information in this disclosure. As one skilled in the art appreciates, the packet of information may contain information encapsulated in multiple layers. Analysis and extraction of information from each layer may lead to information in subsequent layers.

The PADE module 204 includes a protocol and session identification module 230 (sometimes referred to as PSI module 230), prioritized analysis queue 232 (sometimes referred to as PAQ module 232) and parsing and matching module 234 (sometimes referred to as PAM module 234). The PADE module 204 is configured to receive packet of information. The PADE module 204 queues the received packet to be stored in the packet and session store 218. Further, the PADE module 204 queues the received packet with an initial priority for further analysis by the PAQ module 232. The PAM module 234 analyzes the received packet by parsing protocol information from the packet content for each protocol encapsulated in the packet, and matches that data with feature patterns of interest, for example, security or network visibility. Processing of the packets by the PADE module 204 is an iterative process, where one level of encapsulation is processed to determine and discover information in that protocol and the protocol of the next encapsulation.

In one example, the prioritization used for analysis of the packet is based on a probability that the packet may be associated with a threat. This prioritization may be periodically updated, as the analysis of the packet proceeds. In some situations, there may be insufficient resources available at the packet and session store 218 to store all packets that are queued for storage. In one example, the selection of packet information to write (or store) to the packet and session store 218 may be based on a value of threat probability. In some examples, the selection of packet information to store may be based on a value of threat probability at the time selection is made, rather than when the packet was queued for storage. In other words, the queue to store the packet information is prioritized based on a value of threat probability.

Once a packet has been selected for storage, raw data of the packet may be written into the packet and session store 218 in a compressed form. The packet and session store 218 may also have indexing data for the packets to facilitate retrieval of the packets based on one or more attributes. For example, the attributes for indexing may be one or more of packet timestamp, network addresses, protocol and the like. Connection information extracted and generated by the PADE module 204 from one or more packets may contain references to corresponding sessions in the packet and session store 218. In one example, connection information may be stored in the knowledge graph 214, after further processing. Connection information may correspond to a plurality of attributes like user computer, details about user of the user computer, host server, organization of the user of the user computer and the like.

The PADE module 204 based on the analysis of the packets, identifies signal records, which may sometimes be referred to as weak signals indicative of a threat, transaction records and connection records. The identified signal records 236, transaction records 238 and the connection records 240 are stored in the data buffer 206 for further processing.

The statistics engine 208 processes the connection records 240 stored in the data buffer 206 and profiles the connection information from the connection records. Connection information may be stored in the knowledge graph 214, after further processing by the statistics engine 208. Connection information may correspond to a plurality of attributes like user computer, details about user of the user computer, host server, organization of the user of the user computer and the like.

The transaction processor 210 processes the transaction records 238 and extracts transaction information from the transaction records. Extracted transaction information by the transaction processor 210 is stored in the knowledge graph 214. Selective extracted transaction information is also stored in the signal and story store 216.

The analytics engine 212 processes the signal records 236. As previously indicated, signal records 236 may indicate weak signals of an impending threat. The analytics engine 212 analyzes the signal records 236 and develops a possible story of a likely threat. The story may be a sequence of signals about user computer, activity being performed and the like. The hypothesis tester 242 evaluates one or more weak signals for a likely threat. For example, one or more threshold values may be used to evaluate a likely threat. The story builder 244 builds a possible scenario for a likely threat, based on analyzed signal records. Selective generated story and corresponding signal records may be stored in the signal and story store 216.

As one skilled in the art appreciates, the information previously stored in the signal and story store 216 may be used by the analytics engine 212 during evaluation of subsequent signal records to further update or modify a possible scenario for a likely threat. Additionally, the analytics engine 212 may use information stored in the knowledge graph 214 during evaluation of signal records and building of a story for a likely threat. The story builder 244 also uses the analyzed signal records to generate information to update priority of analysis of incoming packets by the PADE module 204.

As one skilled in the art appreciates, the data buffer 206 may store information related to signal records 236, transaction records 238 and connection records 240 on a temporary basis. One or more additional data stores may be provided to store these information for an extended period of time, for possible future use. Object store 220 is a data store to store information related to various objects. For example, in some examples, objects may be files exchanged between a user computer and destination computer. Transaction store 222 stores information related to transaction, for example, for an extended period of time.

External integration interface 224 may provide an interface to communicate with other appliances, for example, other security appliances. Threat info feed interface 226 may provide an interface to communicate with external threat information feeds. These external threat information feed may be used by the security appliance 102 during various stages on analysis and story building. Application programming interface 228 may provide interface to one or more applications. For example, application programming interface 228 may provide an interface to an user interface application to permit a user to interact with the security appliance 102.

Figure 3:
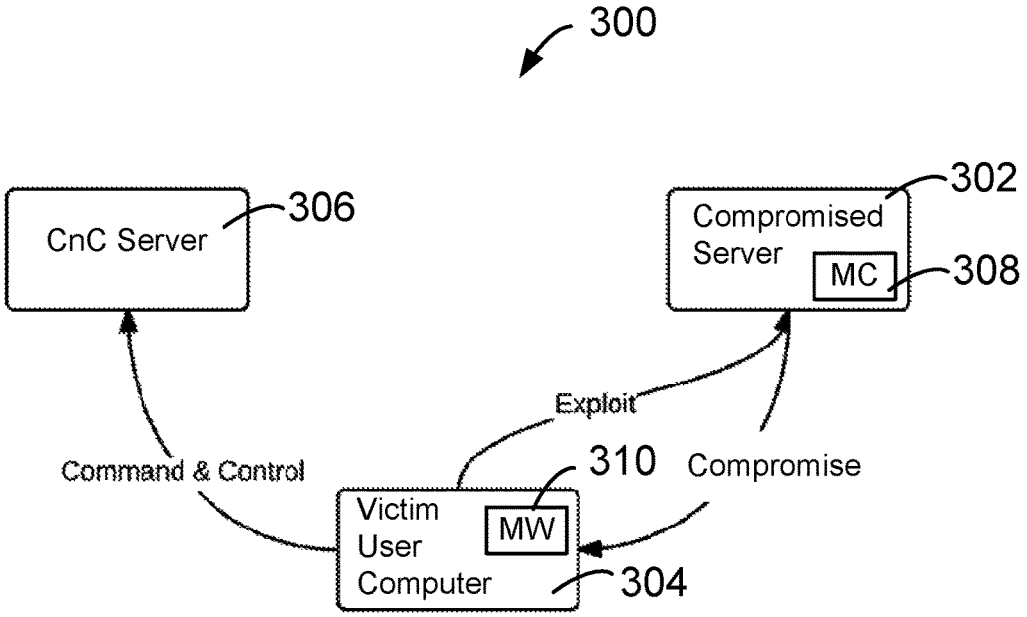
FIG. 3 shows various phases of an example malicious attack in an example computing environment.

Having described an example security appliance 102 of this disclosure, now referring to FIG. 3, flow diagram 300 shows various phases of an example malicious attack. FIG. 3 shows a compromised server 302, a victim user computer 304 and a command and control server 306 (sometimes referred to as a CnC server 306). In some examples, the victim user computer 304 may correspond to one of the first user computer 104-1, second user computer 104-2 and third user computer 104-3 described with reference to FIG. 1. In some examples, the compromised server 302 may correspond to first server 116 described with reference to FIG. 1. In some examples, the CnC server 306 may correspond to one or more of the second server 118, third server 120 and fourth server 122 described with reference to FIG. 1.

In general, a hacker compromises an external website running on a server the victim user computer 304 visits regularly, and injects malicious content 308 (sometimes referred to as malicious code 308) into the website. For example, the malicious content 308 may be present on the compromised server 302. When a user from the victim user computer 304 visits the website on the compromised server 302, the malicious code 308 may be executed. In some examples, the malicious code 308 may be an executable JavaScript. This phase may sometimes referred to as an exploit phase. In some examples, the malicious code 308 may load a malware 310 on to the victim user computer 304.

The malware 310 loaded on to the victim user computer 304 may be an executable code. This phase may sometimes be referred to as a compromise phase. The malware executable code may then connect to the CnC server 306 and waits for commands from the CnC server 306 to be executed on the victim user computer 304. This phase may sometimes referred to as command and control phase.

According to an example of this disclosure, one or more weak signals of a possible threat may be detected by the security appliance 102, in each of the exploit phase, compromise phase and command and control phase. For example, in the exploit phase, the malicious code 308 typically contain long lines of codes. For example, malicious code 308 may contain about 1000 characters or more. On the other hand, a legitimate JavaScript code may contain short lines of codes. For example, about 80 characters. In other words, in an example implementation, a threshold length of code may be defined and if a suspect code is greater than the threshold length of code, it may indicate a likely weak signal of a threat. As an example, if an anticipated average code length is about 80 characters, a threshold length of code may be set as a multiple of the anticipated average length of code, for example, two to ten times the anticipated average length of code. As one skilled in the art appreciates, the length of malicious code 308 may be detected or measured when the malicious code 308 is downloaded into the victim user computer 304 for execution. In some examples, the length of malicious code 308 may be measured by the security appliance 102, by intercepting the communication between the compromised server 302 and victim user computer 304.

In some examples, the malicious code may modify the entire document content. For example, the JavaScript code may modify the entire document using document.write function. In other words, in an example implementation, a function executed by a likely malicious code is determined and based on the function executed by the likely malicious code, a likely weak signal of a threat may be generated or triggered. As an example, the malicious code 308 is evaluated for type of function being performed. In some examples, the malicious code 308 is evaluated for the type of function being performed, in the security appliance 102, by intercepting the communication between the compromised server 302 and victim user computer 304.

In the compromise phase, the malware 310 typically is a small executable file. Generally, malware file sizes are in the range of about 100 kilobytes to 300 kilobytes. On the other hand, a legitimate installation file will be typically larger, for example, in the range of at least about 1 MB or greater. In other words, in an example implementation, a threshold value for a file size of the likely malware may be defined and if a suspect malware is less than or equal to the threshold file size, it may indicate a likely weak signal of a threat. As an example, if an average malware size may be set and a multiple of the average malware size may be set as a threshold value. For example, a multiple of one to three may be set as a threshold value. If for example, average malware size is set at 200 kilobytes, a multiple of three is used, threshold value of the file size will be 600 kilobytes. If an executable file of less than equal to 600 kilobytes is downloaded, the executable file may be a malware, indicating a likely weak signal. In some examples, the malware 310 may be encrypted or obfuscated. In other words, in an example implementation, an encrypted or obfuscated file may indicate a likely weak signal of a threat.

In the command and control phase, the malware 310 may send one or more HTTP POST requests with small random looking content to the CnC server 306. In response, the CnC server 306 may send empty responses to these HTTP POST requests. In some examples, the posted content may be different, but of same size. In other words, in an example implementation, communication between a victim user computer and a server is evaluated for the type of communication and content exchanged between the victim user computer and the server for a pattern. If the communication matches the pattern, it may indicate a likely weak signal of a threat.

Figures 1, 4:
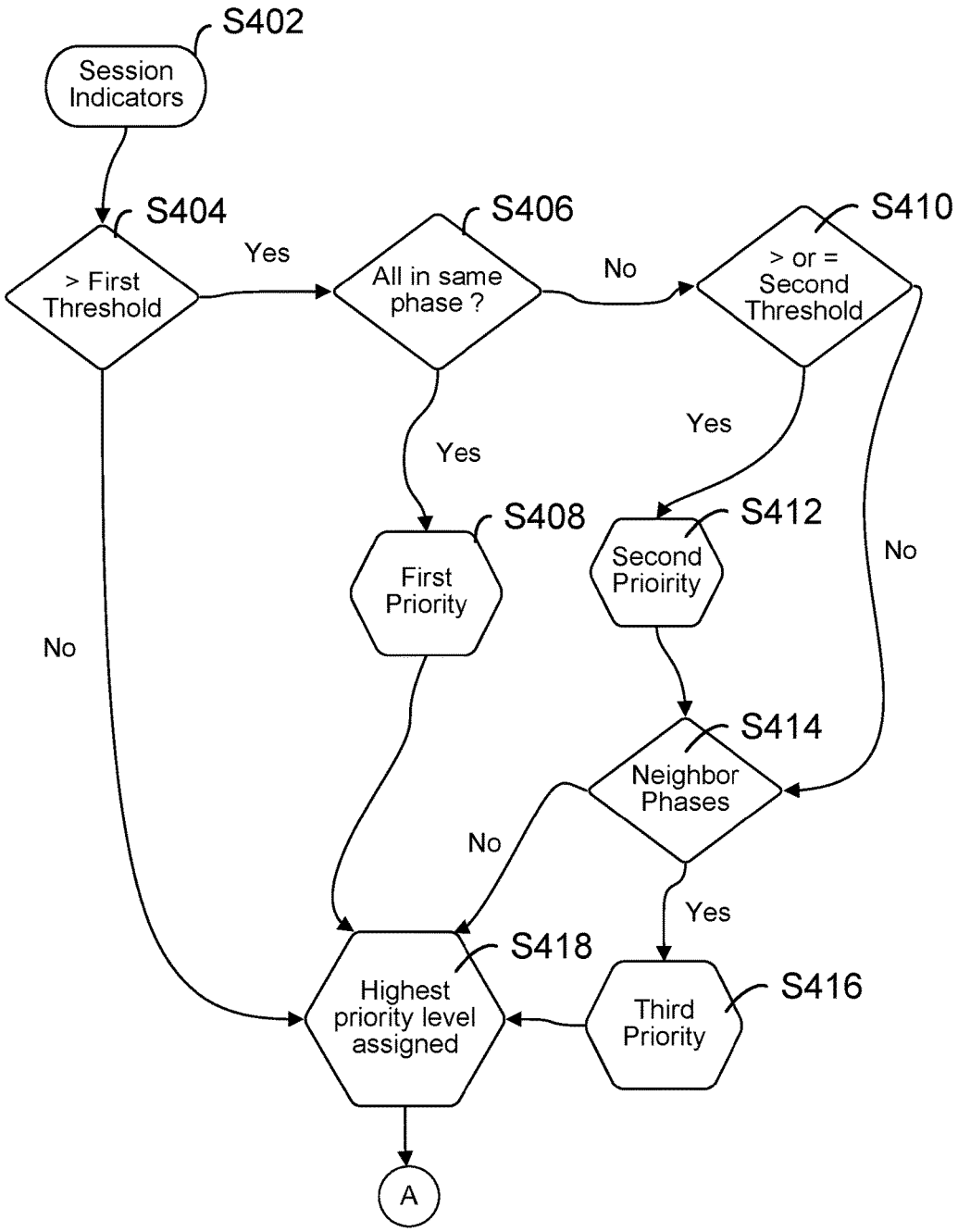
Figures 2, 4:
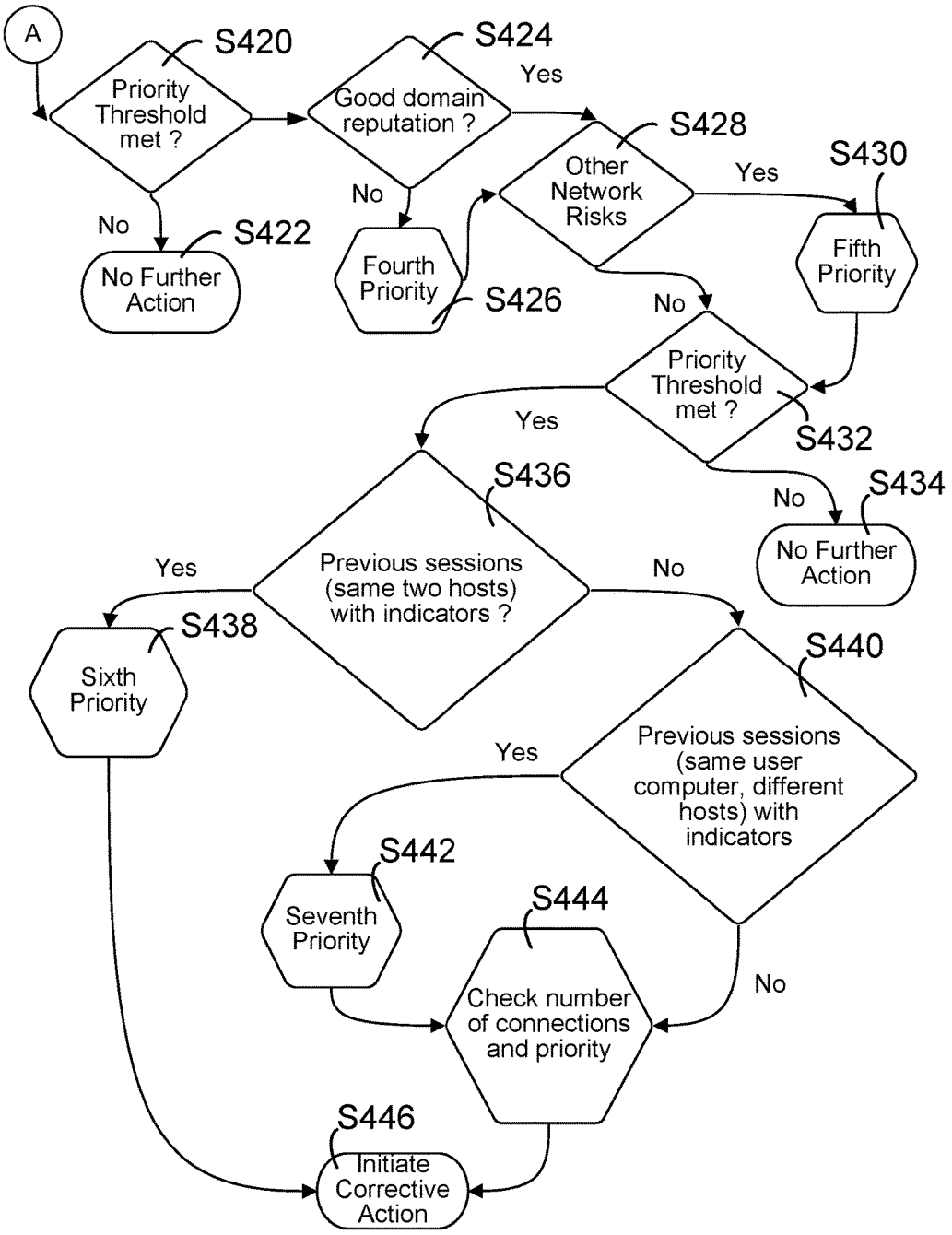

Having described various phases of likely malicious attack and identification of likely weak signals of threat by the security appliance 102. Now, referring to FIG. 4, an example flow diagram 400 is shown, which is used to evaluate the weak signals for a likely threat by the security appliance 102.

Now, referring to flow diagram 400, in block S402 stored session indicators are retrieved. For example, the session indicators may be signal records 236, transaction records 238 and connection records 240 stored in the data buffer 204. In some examples, session indicators may be weak signals stored in the data buffer 204. In some examples, session indicators may be weak signals for a specific session. Sessions may be network sessions consisting of information transferred over a single communication channel (for example, a TCP connection or a UDP connection) between communication software on different computing devices. Generally, sessions consist of data sent back and forth between two computing devices. In some examples, more than two computing devices may participate, for example, in a broadcast session or a multicast session.

In block S404, session indicators are checked for a first threshold value. For example, a first threshold value of greater than 2. In other words, to check if there were more than two weak signals in the session. As an example, with reference to FIG. 3, if the command and control phase had more than two weak signals, for example, random POST requests with small random looking content and receiving empty responses to POST requests, the first threshold value set in block S404 would be met. For example, the analytics engine 212 of the security appliance 102 may perform these functions. In some examples, the hypothesis tester 242 of the security appliance 102 may perform these functions. If the first threshold value is not met, the priority of the threat remains at an initialized value, for example, zero.

When the first threshold value is met in block S404, next in block S406, whether the weak signals belong to the same phase of a likely attack is checked. For example, if the weak signals belong to an exploit phase or a compromise phase. If all the weak signals occurred in the same phase in block S406, in block S408, the priority of the threat associated with the weak signals is set to a first priority level.

For example, the first priority level may be set at a value of 10, a value higher than the initialized value. If only some of the weak signals occurred in the same phase, in block S410, the number of weak signals are compared to a second threshold value. For example, the second threshold value may be set to 1. If the number of weak signals is equal to or greater than the second threshold value, then the priority of the threat associated with the weak signals is set to a second priority level in block S412.

For example, the second priority level may be set to 100, which is greater than both the initialized value and first priority level value. If only some of the weak signals occurred in the same phase, say below the second threshold value in block S410, then in block S414, the weak signals are checked to see if they were generated in neighbor phases. For example, exploit phase and compromise phase or compromise phase and command and control phase may be considered as neighbor phases. So, if weak signals are present in neighbor phases. The priority of the threat associated with the weak signals is increased to a third priority level in block S416.

For example, the third priority level may be set to a value of 1000. As one skilled in the art appreciates, the third priority level is greater than both the initialized value, first priority level value and the second priority level value. If weak signals are not present in neighbor phases, the priority of the threat remains at the initialized value for priority of threat, which in this example, is set to zero.

In block S418, highest priority level is applied. For example, highest priority level achieved based on the analysis is assigned as the priority level. For example, if only first priority and second priority levels are present, priority level with highest value is chosen. If on the other hand, first priority, second priority and third priority are all present in the session, then, priority level with highest value is chosen. If the priority level remains at the initialized value, that will be priority level chosen for the threat.

In some examples, after the analysis of the weak signals, based on a threshold value for the assigned priority level for the threat, in block S420, the weak signals are considered as not a likely threat and no further action is taken in block S422 or as a likely threat for further evaluation in block S424. For example, if priority threshold of 100 is set in block S420, then, only if the highest priority level assigned in S418 is at or greater than 100, further action is taken in block S424. If the highest priority level assigned in S418 is below 100, no further action is taken in block S422. All the session data is stored for future use.

In block S424, the CnC server domain reputation is checked. For example, if the server domain reputation is good or bad.

Indicators of good domain reputation include one or more of the following. Presence of the domain name in search engine indexes. Domain certificate issued from a reputed certification authority. Presence of the domain name in top website ranking lists. Domain hosting advertisement related codes.

Indicators of bad domain reputation include one or more of the following. Presence of the domain in malware sites list, for example lists maintained by one or more third party sites. Domain recently registered, for example, within few days to months, as against domains present for a longer duration, for example, one or more years. The domain IP address changing frequently. In other words, the domain server is hosted with different IP addresses, In some examples, the domain server may be hosted with different IP addresses periodically, for example, every seven to ten days.

If the CnC server has indications of a bad reputation (or not a good domain reputation), the priority of the threat associated with the weak signals is increased to a fourth priority level in block S426. For example, fourth priority level may have a value derived by multiplying highest priority level assigned in block S418 by a factor of 10. So, if the highest priority level assigned in block S418 is 100, the value of the fourth priority level will be 1000. On the other hand, if the highest priority level assigned in block S418 is 1000, the value of the fourth priority level will be 10000.

If the CnC server has a good domain reputation, then the value of highest priority level assigned in block S418 will continue to be the priority level for the threat. In other words, the value of threat priority level entering the block S424 may be 100 or 1000. For a value of entering priority level for the threat of 100, value of priority level for the threat exiting block S424 may be 100 (for good domain reputation) or 1000 (for bad domain reputation). And, for a value of entering priority level for the threat of 1000, value of priority level for the threat exiting block S424 may be 1000 (for good domain reputation) or 10,000 (for bad domain reputation). In summary, the value of priority level for the threat entering block S428 will be either 100, 1000 or 10,000.

Then, in block S428, other network risks associated with the weak signals are checked. For example, one or more attributes of the weak signals may be compared with known threats for example, from external resources received through the threat info feed interface for a third threshold value. If other network risks are present, the priority of the threat associated with the weak signals is increased to a fifth priority level in block S430.

For example, fifth priority level may have a value derived by multiplying value of priority level for the threat entering block S428 by a factor of 10. In other words, the value of fifth priority level may be 1000, 10,000 or 100,000. If there are no other network risks in block S428, the value of the priority level for the threat will remain at 100, 1000 or 10,000.

In some examples, after the analysis of the weak signals, based on the assigned priority level for the threat, in block S432, the weak signals are considered as not a likely threat and no further action is taken in block S434 or as a likely threat for further evaluation in block S436. For example, if priority threshold of 10,000 is set in block S420, then, only if the value of the priority level for the threat entering in block S432 is at or greater than 10,000, further action is taken in block S436. If value of the priority level for the threat entering in block S432 is below 10,000, no further action is taken in block S434. All the session data is stored for future use. For example, the value of the priority level for the threat entering block S436 will be either 10,000 or 100,000.

In block S436, previous sessions between the victim user computer and compromised server or the CnC server is checked for possible weak signals. If there were weak signals in previous sessions, in block S438, the priority of the threat associated with the weak signals is increased to a sixth priority level.

For example, sixth priority level may have a value derived by multiplying value of priority level for the threat entering block S436 by a factor of 10. In other words, the value of sixth priority level may be 100,000 or 1,000,000. If there were no weak signals in previous sessions, the value of the priority level for the threat will remain at 10,000 or 100,000.

If there were no weak signals in previous sessions, in block S440, other sessions with same victim user computer is checked for possible weak signals. For example, to other servers which may be acting as a CnC server. If there were weak signals in previous sessions with the victim user computer, in block S442, the priority of the threat associated with the weak signals is increased to a seventh priority level.

For example, seventh priority level may have a value derived by multiplying value of priority level for the threat entering block S440 by a factor of 10. In other words, the value of seventh priority level may be 100,000 or 1,000,000. If there were no weak signals in other sessions with same victim user computer, the value of the priority level for the threat will remain at 10,000 or 100,000.

Next, in block S444, number of connections to likely hosts that may be acting as a CnC server is checked. If the number of connections are small, say below a connection threshold value, the host server may be considered as a likely CnC server. If the connections are equal to or greater than the connection threshold value, it may indicate that the host may be a well known host with lots of connections and who generate weak signals based on their unique operation but not likely a CnC server. If it is concluded that the host is a well known host, no further action may be taken. In some examples, the value of the priority level of the threat is also evaluated to decide if the priority level of threat is high or low. For example, a value of the priority level of the threat may be set at say, 100,000 or more. If the value of the priority level of the threat entering the block S444 is less than 100,000 no corrective action is taken. If the value of the priority level of the threat entering block S444 is equal to or greater than 100,000, a corrective action is initiated in block S446. If no corrective action is taken, session information is stored for future use.

In block S446, a corrective action is initiated. As one skilled in the art appreciates, once a server is identified as a likely CnC server, in some examples, any further access to the likely CnC server may be blocked, as a corrective action. For example, a signal may be sent from the security appliance to the firewall device to prevent any future communication with the CnC server. In some examples, attributes of the weak signals along with the likely CnC server identification information may be presented to a user on a computing device, using the application programming interface of the security appliance. The user may perform additional review and take necessary corrective action. In some examples, the malicious code from the victim user computer may be deleted.

Figure 5:
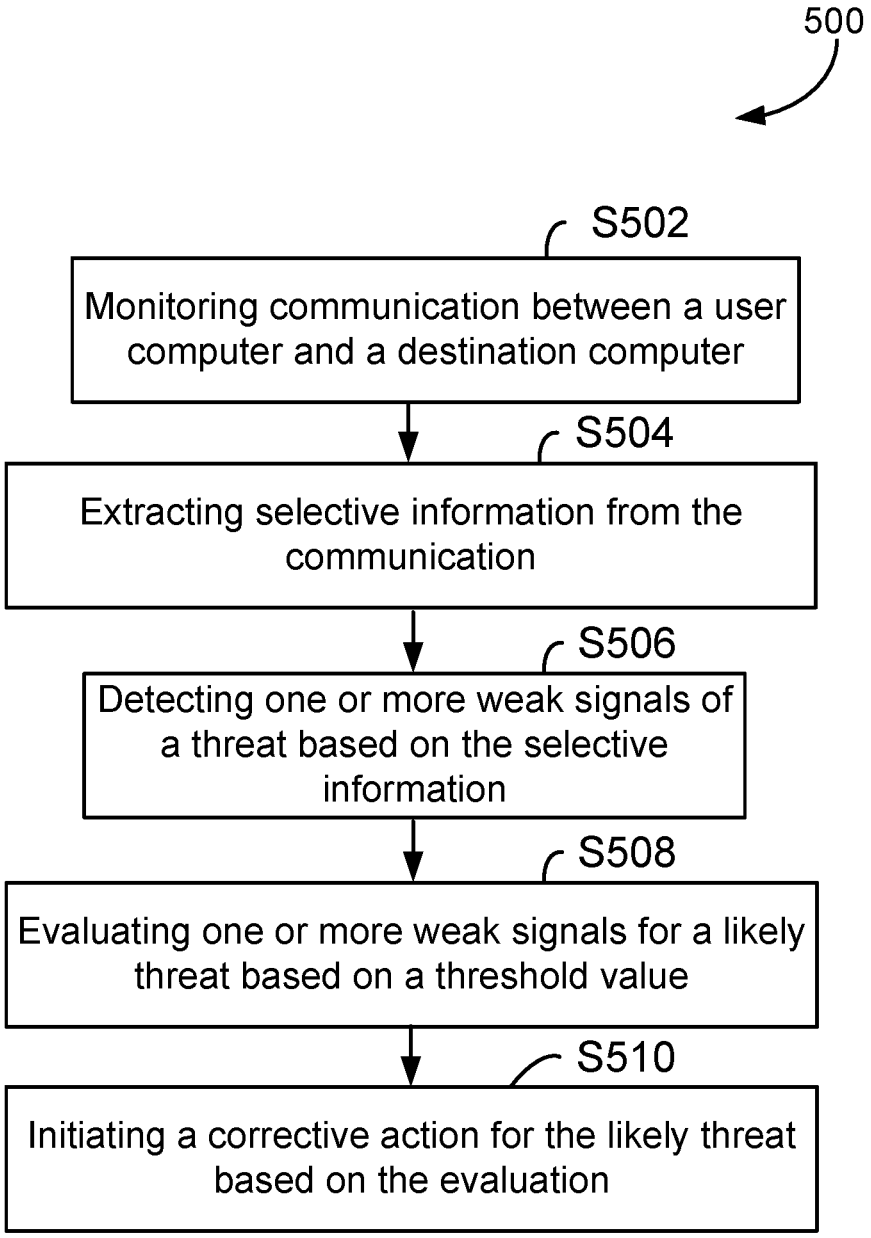
FIG. 5 shows another flow diagram to detect a malicious attack, according to an example of this disclosure.

Now, referring to FIG. 5 another example flow diagram 500 is described. In block S502, communication between a user computer and a destination computer is monitored. For example, the user computer may be the victim user computer 304 and the destination computer may be a compromised server 302 as described with reference to FIG. 3.

In block S504, selective information from the communication is extracted. For example, as described with reference to security appliance 102 of FIG. 2 selective information from the packets are extracted. In block S506, one or more weak signals of a threat are detected based on the selective information. For example, as described with reference to security appliance 102 of FIG. 2 and example malicious attack described with reference to FIG. 3, one or more weak signals of a threat are detected.

In block S508, one or more weak signals of a threat are evaluated for a likely threat based on a threshold value. For example, as described with reference to security appliance 102 of FIG. 2, example malicious attack described with reference to FIG. 3 and flow diagram 400 described with reference to FIG. 4, one or more weak signals of a threat are evaluated for a likely threat based on a threshold value. One or more priority levels are assigned based on the evaluation.

In block S510, a corrective action is initiated for the likely threat, based on the evaluation. For example, as described with reference to security appliance 102 of FIG. 2, example malicious attack described with reference to FIG. 3 and flow diagram 400 described with reference to FIG. 4, corrective action is initiated for the likely threat.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for detecting a likely *malware* threat from a malicious attack *by malware*, comprising:

monitoring a communication between a user computer and at least one destination computer by a security appliance;

extracting selective information from the communication by the security appliance;

detecting one or more weak signals *indicative* of a likely malware threat based on the extracted selective information from the communication, by the security appliance, *wherein each of the one or more weak signals is associated with one of a plurality of attack phases*;

evaluating one or more weak signals for the likely malware threat based on a threshold value by the security appliance[; and], *including:*

*determining a first plurality of threat levels based at least on the one or more weak signals and their associated attack phases;*

*selecting a highest threat level among the first plurality of threat levels; and*

*increasing a value of the selected threat level based on interactions of the user computer with at least one destination computer; and* initiating a corrective action for the likely malware threat based *at least* on the [evaluation of the one or more weak signals for the likely malware threat by the security appliance] *increased value of the selected threat level.*

[2. The method of claim 1, wherein, the malicious attack by the malware has a plurality of phases.]

3. The method of claim [2] *1*, wherein, at least more than one weak signal for the likely malware threat is detected in at least one of the plurality of phases of the malicious attack by the malware.

4. The method of claim [2] *1*, wherein, [communication] *during a single session* between the user computer and *the* at least one destination computer [is in a single session and], one or more weak signals for the likely malware threat are detected [in the single session].

5. The method of claim 4, wherein one or more weak signals for the likely malware threat are detected in at least two of the phases of the malicious attack by the malware [in] *during* the single session.

6. The method of claim 1, wherein one of the *at least one* destination computer is a compromised server and another one of the *at least one* destination computer is a command and control server for the malware.

7. The method of claim 6, wherein *determining one or more weak signals comprises increasing* a priority of [a] *the* likely malware threat [is increased if] *in response to* the command and control server [domain registration based on a] *having an indicator of a bad* domain reputation.

8. The method of claim 4, wherein *determining one or more weak signals comprises evaluating* communication between the user computer and *the* at least one destination computer in prior one or more sessions [is evaluated] for indication of weak signals for the *likely* malware threat, and [if] *in response to an indication of* weak signals for the *likely* malware threat [are indicated], *increasing* a priority of [a] *the* likely *malware* threat [is increased].

9. The method of claim 8, *wherein one of the at least one destination computer is a command and control server for the malware,* wherein *determining one or more weak signals comprises comparing a* number of communications between the user computer and [a] *the* command and control server for the malware [is compared] to a threshold value, and [if] *in response to* the number of communications [is] *being* below [a] *the* threshold value, [a] *increasing the* priority of [a] *the* likely *malware* threat [is increased].

10. A system to detect a likely *malware* threat of a malware attack, *by malware* comprising:

a security appliance *comprising a hardware computing device* configured to*:* monitor a communication between a user computer and a destination computer;

extract selective information from the communication;

detect one or more weak signals *indicative* of a likely malware threat based on the extracted selective information from the communication, *wherein each of the one or more weak signals is associated with one of a plurality of attack phases*;

evaluate one or more weak signals for the likely malware threat based on a threshold value[; and], *including:*

*determine a first plurality of threat levels based at least on the one or more weak signals and their associated attack phases;*

*select a highest threat level among the first plurality of threat levels; and*

*increase a value of the selected threat level based on interactions of the user computer with at least one destination computer; and* initiate a corrective action for the likely malware threat based *at least* on the [evaluation of the one or more weak signals for the likely malware threat] *increased value of the selected threat level.*

[11. The system of claim 10, wherein, the malicious attack by the malware has a plurality of phases.]

12. The method of claim [11] *10*, wherein, at least more than one weak signal of the likely malware threat is detected in at least one of the plurality of phases of the [malicious] *malware* attack by the malware.

13. The system of claim [11] *10*, wherein, [communication] *during a single session* between the user computer and

*the* at least one destination computer [is in a single session and], one or more weak signals of the likely malware threat are detected [in the single session].

14. The system of claim 13, wherein one or more weak signals of the likely malware threat are detected in at least two of the phases [in] *during* the single session.

15. The system of claim 10, wherein one of the *at least one* destination computer is a compromised server and another one of the *at least one* destination computer is a command and control server of the malware.

16. The system of claim 15, wherein *to determine one or more weak signals comprises increasing* a priority of [a] *the* likely malware threat [is increased] if the command and control server [domain registration is based on a] *has an indicator of a bad* domain reputation.

17. The system of claim 13, wherein *to determine one or more weak signals comprises evaluating* communication between the user computer and *the* at least one destination computer in *a* prior one or more sessions [is evaluated] for indication of weak signals of the likely malware threat, and if weak signals of the likely malware threat are indicated, *increasing* a priority of the likely malware threat [is increased].

18. The system of claim 17, *wherein one of the at least one destination computer is a command and control server of the malware,* wherein *to determine one or more weak signals comprises comparing a* number of communications between the user computer and [a] *the* command and control server of the malware [is compared] to a threshold value, and if the number of communications is below [a] *the* threshold value, *increasing* the priority of [a] *the* likely malware threat [is increased].

19. The method of claim 1, wherein one of the weak signals of the *likely* malware threat is based on the selective information of the communication indicative of a file size.

20. The system of claim [1] *10*, wherein one of the weak signals of the *likely* malware threat is based on the selective information of the communication indicative of a file size.

* * * * *